Jan. 6, 1931.                F. E. STAHL                1,788,070
                          SIDE CHAIN FASTENER
                         Filed Feb. 25, 1929

Inventor
FRANK E. STAHL
By
his Attorneys

Patented Jan. 6, 1931

1,788,070

UNITED STATES PATENT OFFICE

FRANK E. STAHL, OF TONAWANDA, NEW YORK, ASSIGNOR TO COLUMBUS McKINNON CHAIN COMPANY, OF TONAWANDA, NEW YORK, A CORPORATION OF NEW YORK

SIDE-CHAIN FASTENER

Application filed February 25, 1929. Serial No. 342,370.

This invention relates more particularly to a connecting device for side chains of an anti-skid means for automobile tires.

The object of the invention is principally to provide an improved, simplified and economically manufactured device of this kind that may be easily manipulated to connect or disconnect the side chain and yet so securely connect the side chain that it cannot in normal operation become accidentally disengaged. Other objects may be gathered from the disclosure.

The invention is embodied in the example herein shown and described, the features of novelty being finally claimed.

In the accompanying drawings—

Figure 1:
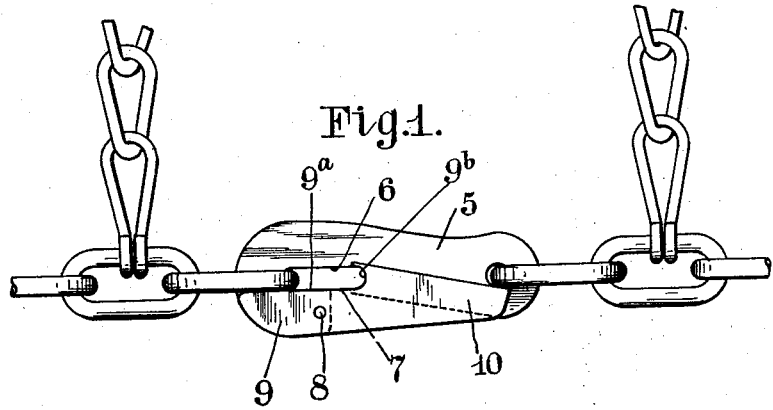
Figure 1 is a side view of the connecting device according to my invention showing it applied to the ends of a side chain of an anti-skid device, fractions of cross chains thereof being shown.
Figure 2:
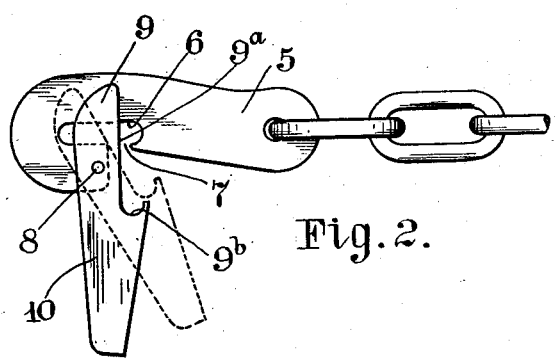
Fig. 2 illustrates a similar view of the connecting device with the left hand end of the side chain detached and the latching member of the device hanging down.

In the views 5 designates the body of the connecting member, it being formed of a piece of flat metal cut to form a hook having at one end an ellipsoidal opening 6 with an entrance thereto at 7 for the left end link of the side chain.

The right hand end of the hook body is perforated to permanently receive an end of the side chain.

Pivoted by a stout pin 8 on the end of the hook at a point opposite or nearly opposite the middle of the opening 6 is a confining lever having an arm 9 with a straight edge $9^a$ standing across the opening 6 when the lever is turned down and an arm 10 sufficiently long to contact with the link in the right hand end of the hook or body. This longer arm 10 affords a handle for manipulating the lever to effect the connection of the free link with or its disconnection from the connecting device.

Figure 3:
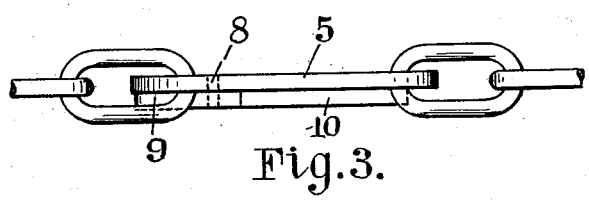
Fig. 3 is a top view of the device as shown in Fig. 1 with parts omitted.

The straight edge $9^a$ terminates at one end in a seat $9^b$ for the left hand or free link when said link is to be connected with the connecting device and when it is desired to effect such connection the said link is first lodged in said seat and then the lever lifted by pressure on its longer arm to cause the link to slide into the position indicated in Figs. 1 and 3. In this operation it will be noted that the free link passes from one side of the pivot of the lever to the other and because of the pull of the side chain said lever is locked from coming down until positively forced to do so by pressure applied to the longer arm of the lever. As shown in Fig. 1 when the side chain is connected the lever at its long arm impinges against the right hand link. The release of the side chain is therefore effected by reverse movement of the lever the free link dropping into the seat $9^b$ from which it is manually removed.

The forms of the parts can be changed without departing from the gist of the invention as claimed.

What I claim is:

1. A connecting device for the side chain of an anti-skid device including a flat body portion having at one end means permanently connecting a link of the side chain thereto and in one edge at the other end a laterally open ellipsoidal recess forming a hook constituting the normal seat for a detachable link, and a lever having an offset seat forming a temporary seat for said detachable link and an edge for shifting such detachable link into the aforesaid normal seat of the ellipsoidal opening, said lever pivoted to the terminal portion of said hook in a line substantially at right angles to and intersecting the major axis of said ellipsoidal recess.

2. A connecting device for the side chain of an anti-skid device including a flat body portion having at one end means permanently connecting a link of the side chain thereto and in one edge at the other end a laterally open ellipsoidal recess forming a hook constituting the normal seat for a detachable link, and a lever having an offset seat forming a temporary seat for said detachable link and a straight hookless edge for shifting such detachable link into the aforesaid normal seat of the ellipsoidal opening, said lever pivoted to the terminal portion of said hook in a line substantially at right angles to and intersecting the major axis of said ellipsoidal recess.

3. A connecting device for the side chain of an anti-skid device including a flat body portion having at one end means permanently connecting a link of the side chain thereto and in one edge at the other end a laterally open ellipsoidal recess forming a hook constituting the normal seat for a detachable link, and a lever having an offset seat forming a temporary seat for said detachable link and an edge for shifting such detachable link into the aforesaid normal seat of the ellipsoidal opening, said lever pivoted to the terminal portion of said hook in a line substantially at right angles to and intersecting the major axis of said ellipsoidal recess with its said link-shifting edge standing beyond the terminus of the hook when standing at right angles to said ellipsoidal opening.

FRANK E. STAHL.